(12) United States Patent
Jang et al.

(10) Patent No.: US 10,747,721 B2
(45) Date of Patent: Aug. 18, 2020

(54) FILE MANAGEMENT/SEARCH SYSTEM AND FILE MANAGEMENT/SEARCH METHOD BASED ON BLOCK CHAIN

(71) Applicant: INDUSTRY-UNIVERSITY COOPERATION FOUNDATION SOGANG UNIVERSITY, Seoul (KR)

(72) Inventors: Ju-Wook Jang, Seoul (KR); Moon Yong Jung, Ulsan (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 127 days.

(21) Appl. No.: 16/310,654

(22) PCT Filed: May 2, 2017

(86) PCT No.: PCT/KR2017/004672
§ 371 (c)(1),
(2) Date: Dec. 17, 2018

(87) PCT Pub. No.: WO2018/043865
PCT Pub. Date: Mar. 8, 2018

(65) Prior Publication Data
US 2019/0179801 A1    Jun. 13, 2019

(30) Foreign Application Priority Data

Aug. 31, 2016   (KR) ......................... 10-2016-0111914

(51) Int. Cl.
*G06F 16/30*   (2019.01)
*G06F 16/13*   (2019.01)
(Continued)

(52) U.S. Cl.
CPC .......... *G06F 16/137* (2019.01); *G06F 16/182* (2019.01); *G06F 16/1865* (2019.01)

(58) Field of Classification Search
CPC ... G06F 16/137; G06F 16/182; G06F 16/1865
(Continued)

(56) References Cited

U.S. PATENT DOCUMENTS

2015/0332283 A1   11/2015   Witchey
2016/0027229 A1*   1/2016   Spanos ................... G07C 13/00
                                                                    705/51
(Continued)

OTHER PUBLICATIONS

Crosby, et al., BlockChain Technology, Sutardja Center for Entrepreneurship & Technology Technical Report, 2015, pp. 1-35.
(Continued)

*Primary Examiner* — Sana A Al-Hashemi
(74) *Attorney, Agent, or Firm* — Cantor Colburn LLP

(57) ABSTRACT

Provided is a file management/search system based on a block chain capable of identifying a data name and an owner of a data. In the file management/search system, a generated data is stored, and a data name together with an IP address and port number of a node in which the data is stored is transmitted in a form of a transaction to other nodes. The nodes receiving the transaction generates blocks on the basis of the transaction and links the blocks to the block chain, so that the data name and the owner information of the owner generating the data are shared by all users. Since this information is recorded in the block chain and all the nodes share the same information, a malicious node which is to arbitrarily change contents needs to change the contents of the block chain held by all the nodes.

15 Claims, 14 Drawing Sheets

(51) Int. Cl.
   *G06F 16/18*      (2019.01)
   *G06F 16/182*     (2019.01)
(58) Field of Classification Search
   USPC ....... 707/607, 609, 687, 705, 769, 790, 813, 707/821
   See application file for complete search history.

(56) References Cited

U.S. PATENT DOCUMENTS

2017/0249482 A1* 8/2017 Takaai ................ H04L 9/3263
2017/0364908 A1* 12/2017 Smith ................. G06Q 20/023
2018/0295546 A1* 10/2018 Crawford ............ H04L 67/104

OTHER PUBLICATIONS

International Search Report—PCT/KR2017/004672 dated Jul. 24, 2017.
Korbit, Technical understanding of the block chain and First steps for adoption, 2016.
Ammous, Blockchain Technology: What is it good for?, 2016, pp. 1-5.

* cited by examiner

FIG. 6A

```
oo    Sending for nodes    oo

Node 1
Node IP : 163.239.198.120  // Node port : 13000
Transaction : ['2750399352' , ' 974946116120116']
Transaction IP size         : 10
Transaction file name size  : 15
----> to node 1
Sending transaction to node 1 completely Node 2
Node IP : 163.239.195.120  // Node port : 12000
/////////////////////////////////////////////////////////
Avoid to send to my IP&PORT IP : 163.239.198.120 PORT
/////////////////////////////////////////////////////////
--> to node 2 Reject :  < my IP and my TCP port >

Node 3
Node IP : 163.239.198.133  // Node port : 7500
Transaction : ['2750399352' , ' 9749464 6116120116']
Transaction IP size         : 10
Transaction file name size  : 15
----> to node 3
Sending transaction to node 3 completely Sending transaction to all nodes completely
```

FIG. 6B

```
oo   Receiving transaction   oo

Connected by < '163.239.195.120' , 29566 >
Transaction Receiving ..

Transaction info size      : 10
Transaction information    : 2750399352

Transaction info size      : 15
Transaction information    : 9749464611620116

Data over, Receiving finish

Transaction = ['2750399352' , '9749464611620116']
```

FIG. 8

```
------------------------
oo   Sending for nodes   oo
------------------------
Node 1
Node IP : 163.239.198.120   // Node port : 13000
SocketList :  [<socket._socketobject object at 0x0000000002FE1EE8>]
Transaction : ['2750399352' , ' 974946116120116', '275039935212000',u'------BEGIN PUBLIC KEY ------WnMIGbM
BBAAjA4GGAAQAgEz13bixmSUR07bB0G9sp6zDqVW1]n1aJUeEYAmfrkLYsLnMlk6pcDdZKn6yfhUvlHpAAOj8PspK1BPH
nDok+hV%PqyzB1G0]
Transaction : ['2750399352' , ' 974946116120116']
Transaction IP size           : 10
Transaction file name size    : 15
Transaction Port size         : 15
Transaction public key size   : 268
Transaction signature size    : 132
------ > to node 1
Sending transaction to node 1 completely
```

FIG. 10

```
{
    "time    ": "1463486342.25",
    "hash    ": "0d8dc97b8d8891f0920558a6c765fef4f0b156ac1d8044494b8f7f986fdeb3a7",
    "nonce   ": "1536241736",
    "prev hash": "031988190c80e3c570734c03cd0c1be90e92f37c7e36a0f4a3e75b3e77aaefd7"
}
```

FIG. 13A

```
oo  Block JSON file open  oo

Block number   : 1
Hash number    : 0072cc86d6ee94dfb89f8abdaaa15e4ae5f8cebbd205d0ab4ca2f8258cc2a6ed
Time stamp     : 1463486296.39
Nonce          : 5693688799

IP+PORT+Filename : 2750399352130009749461161 20116
Hash Ready       : 2750399352130009749461161 20116 # 5693688799
Result of Hashing : 0x753408d6e6ee9128fb015e43c56c1786f80e1fdc551040a552f507cbdef1f41eL Find hash number : 753408d6e6ee9128fb015e43c56c1786f80e1fdc551040a552f507cbdef1f4e IP+PORT+Filename : 2750399352120009749461161 20116
Hash Ready       : 2750399352120009749461161 20116 # 5693688799
Result of Hashing : 0x72cc86d6ee94dfb89f8abdaaa15e4ae5f8cebbd205d0ab4ca2f8258cc2a6edL Find hash number : 72cc86d6ee94dfb89f8abdaaa15e4ae5f8cebbd205d0ab4ca2f8258cc2a6ed
```

FIG. 13B

```
oo  find file owner  oo

Find file owner
!!!
Block hash = Find hash
!!!
Hash # : 0072cc86d6ee94dfb89f8abdaaa15e4ae5f8cebbd205d0ab4ca2f8258cc2a6ed oo  File request  oo File owner
IP   : 163.239.195.120
PORT : 12000
```

FILE MANAGEMENT/SEARCH SYSTEM AND FILE MANAGEMENT/SEARCH METHOD BASED ON BLOCK CHAIN

TECHNICAL FIELD

The present invention relates to a file management/search system based on a block chain, and more particularly, to a file management/search system and a file management/search method capable of searching for and providing a data name and an owner of data.

BACKGROUND ART

A block chain, also called a public transaction book, is a technique that prevents hacking that may occur when trading with virtual currency. In the case of an existing financial company, a transaction record is stored in a centralized server. However, in the block chain, details of a transaction are transmitted to all users participating in the transaction, and the details of every transaction are compared in order to prevent counterfeiting of data. The block chain is applied to a bit coin, which is a representative online virtual currency. In the bit coin, transactions are transparently recorded on a book that anyone can read, and a large number of computers using the bit coin verify this record every 10 minutes to prevent hacking.

Meanwhile, in the related art, a general file sharing system stores and manages a data or a file in a cloud storage using a centralized server, and users access the cloud storage to request or search for the data or files. In this case, not only a mass storage device is required, but also a centralized server for managing the mass storage device is required, so that there is a problem in that system design and maintenance are complicated.

The present invention proposes a platform for implementing a data management/request system without a centralized server by utilizing a block chain.

SUMMARY OF THE INVENTION

Technical Problem

The present invention is to provide a file management/search system based on block chain capable of storing and managing information on data files stored in each node in a form of the block chain and identifying and searching for an owner of each data file.

The present invention is also to provide a file management/search method used in the file management/search system described above.

Solution to Problems

According to a first aspect of the present invention, there is provided a file management/search system for managing/searching for a data or a file stored in a plurality of nodes by utilizing a block chain, wherein each of the nodes includes: a block chain configured so that blocks including a hash value and a nonce value of a current block, a hash value and a time stamp of a previous block are linked; an IP list that stores IP addresses and port numbers for all the nodes having the block chain; a transaction transmission module that generates a transaction including information on a data, owner information, and a digital signature information when the data or the file is stored or deleted in or from a preset folder and transmits the generated transaction to other nodes having the block chain; and a block chain execution module that, when the transaction is received from another node having the block chain and the block for the received transaction is first generated, transmits a block hash value and a nonce value to other nodes, and when a block hash value and a nonce value are received from another node, generates a block by using received information and links the block to the block chain, wherein each block of the block chain is generated for each data or file stored in a plurality of the nodes, and the block hash value of each block is a hash value generated by applying a preset hash algorithm to information on the data, information on an owner of the data, and the nonce value, wherein the information on the data in the transaction includes a data name, and wherein the information on the owner of the data in the transaction includes the IP address and the port number of the node in which the data is stored.

In the file management/search system according to the first aspect, it is preferable that the transaction transmitting module sets a data name when the data or the file is stored or deleted in or from the preset folder, generates a transaction including the set data name and the IP address and the port number of the corresponding node, and transmits the generated transaction to other nodes having the block chain.

In the file management/search system according to the first aspect, it is preferable that the transaction transmission module allows a first flag indicating data generation to be included in the information on the data and added to the transaction when the data or the file is stored in the preset folder, and allows a second flag indicating data deletion to be included in the information on the data and added to the transaction when the data or the file is deleted from the preset folder.

In the file management/search system according to the first aspect, it is preferable that the block chain execution module executes proof of work on the information of the received transaction to generate the block hash value and the nonce value, and transmits the generated block hash value and the generated nonce value to other nodes when the transaction is received from another node, and verifies validity of the received transaction by using the received block hash value and the received nonce value when the block hash value and the nonce value are received from another node, and generates the block when the validity is verified, and links the generated block to the block chain.

In the file management/search system according to the first aspect, it is preferable that the file management/search system further includes a file search module that searches for the data stored in each node and the owner by using the block chain, wherein the file search module, when a data name to be searched for is input, reads the nonce value of each block stored in the block chain, generates a hash value by using the read nonce value, the input data name, and the IP address and the port number of each node in the IP list, and determines whether or not the generated hash value matches with the block hash value of the block including the nonce value; when there is a block having the block hash value that matches with the generated hash value, determines that the node having the corresponding IP address and the corresponding port number is the owner; and when there is no block having the block hash value that matches with the generated hash value, determines that there is no corresponding data.

According to a second aspect of the present invention, there is provided a file management/search method in each node for managing/searching for a data stored in a plurality of nodes by utilizing a block chain, including steps of: (a)

storing a block chain of blocks, the block chain including a hash value and a nonce value of a current block, a hash value and a time stamp of a previous block; (b) configuring an IP list storing IP addresses and port numbers for all the nodes having the block chain; (c) generating a transaction including information on the data, owner information, and a digital signature information when the data or the file is stored or deleted in or from a preset folder and transmitting the generated transaction to other nodes having the block chain; and (d) when the transaction is received from other nodes having the block chain, generating a block for the received transaction and linking the block to the block chain; wherein each block of the block chain is generated for each data or file stored in a plurality of the nodes, and the block hash value of each block is a hash value generated by applying a preset hash algorithm to information on the data, information on an owner of the data, and the nonce value, wherein the information on the data in the transaction includes a data name, and wherein the information on the owner of the data in the transaction includes the IP address and the port number of the node in which the data is stored.

In the file management/search method according to the second aspect, it is preferable that the step (c) includes: setting a data name when the data or the file is stored or deleted in or from the preset folder; generating a transaction including the set data name and the IP address and the port number of the corresponding node; and transmitting the generated transaction to other nodes having the block chain.

In the file management/search method according to the second aspect, it is preferable that the data name is converted into an ASCII code and included in the transaction, and the IP address and the port number are converted into a decimal format and included in the transaction.

In the file management/search method according to the second aspect, it is preferable that the step (c) includes: allowing a first flag indicating data generation to be included in the information on the data and added to the transaction when the data or the file is stored in the preset folder; and allowing a second flag indicating data deletion to be included in the information on the data and added to the transaction when the data or the file is deleted from the preset folder.

In the file management/search method according to the second aspect, it is preferable that the step (d) includes: when the transaction is received from another node, executing proof of work on the information of the received transaction to generate the block hash value and the nonce value, and when the block hash value and the nonce value are first generated among all the nodes, generating the block by using the block hash value and the nonce value, and transmitting the generated block hash value and the generated nonce value to other nodes; and when the block hash value and the nonce value are received from another node, verifying validity of the received transaction by using the received block hash value and the received nonce value and generating the block when the validity is verified; and linking the generatedblock to the block chain.

The file management/search method according to the second aspect, it is preferable that the file management/search method further includes: (e) a file searching step of searching for and providing a data name requested externally, wherein the file searching step (e) includes: when a data name to be searched for is input, reading the nonce value of each block stored in the block chain, generating a hash value by using the read nonce value, the input data name, and the IP address and the port number of each node in the IP list, and determining whether or not the generated hash value matches with the block hash value of the block including the nonce value; when there is a block having the block hash value that matches with the generated hash value, determining that the node having the corresponding IP address and the corresponding port number is the owner; and when there is no block having the block hash value that matches with the generated hash value, determining that there is no corresponding data.

Effects of the Invention

The file management/search system according to the present invention can search for a data name and identifying an owner of the data by utilizing a block chain and acquire an IP address and a port number of the owner according to the identifying of the owner and request the corresponding data.

In addition, the file management/search system according to the present invention can be used as a platform of the file management/search system that does not require a central management server by utilizing a block chain and can be used as a file sharing request system by identifying a position of a data through block chain searching.

Meanwhile, the file management/search system according to the present invention allows a block hash value of a block chain to include a name of a data and owner information, so that a position of the data can be easily identified by other users.

In addition, since a reliability in a block chain generation process is secured, the file management/search system according to the present invention has integrity through authentication by a digital signature information, non-repudiation, and message digest of block hash generation.

BRIEF DESCRIPTION OF DRAWINGS

FIGS. 6A and 6B are a diagram illustrating the file management/search system according to the preferred embodiment of the present invention. FIG. 6A illustrates that a transaction transmitting node as a data owner that has generated a data or a file outputs a transaction transmission result, and FIG. 6B illustrates that a transaction receiving node outputs a transaction reception result.

FIG. 8 is a diagram illustrating a transaction including a digital signature information and a public key in the file management/search system according to the preferred embodiment of the present invention.

FIG. 10 is a diagram illustrating that a block newly generated by each node is stored in the form of a Json file in the file management/search system according to the preferred embodiment of the present invention.

FIGS. 13A and 13B are a diagram illustrating the file management/search system according to the preferred embodiment of the present invention. FIG. 3A illustrates that a block Json file of a block chain is opened and comparison with information of an IP list, and FIG. 13B illustrates a result of finding the searched data name in the block chain.

BEST MODE FOR CARRYING OUT THE INVENTION

The present invention relates to a file management/search system based on a block chain of which a data name and an owner can be identified. A generated data is stored, and a data name together with an IP address and port number of a node in which the data is stored is transmitted in a form of a transaction to other nodes. The nodes receiving the transaction generates blocks on the basis of the transaction and links the blocks to the block chain, so that the data name and the owner information of the owner generating the data are shared by all users. Since this information is recorded in the block chain and all the nodes share the same information, a malicious node which is to arbitrarily change contents needs to change the contents of the block chain held by all the nodes. However, the arbitrary change is impossible practically. Therefore, the block chain itself is excellent in security.

Hereinafter, a structure and operations of a file management/search system based on a block chain according to a preferred embodiment of the present invention will be described in detail with reference to the accompanying drawings.

Figure 1:
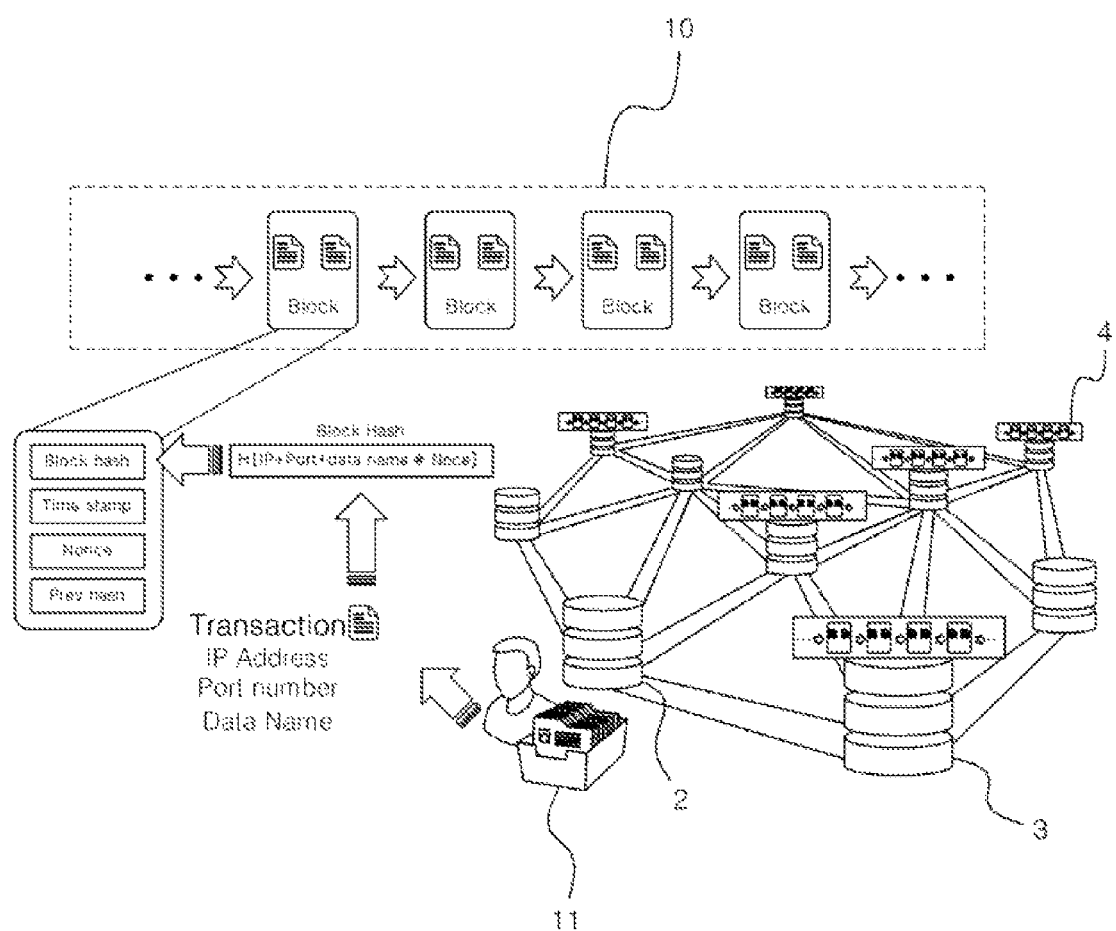
FIG. 1 is a block diagram of a file management/search system based on a block chain according to a preferred embodiment of the present invention.
Figure 2:
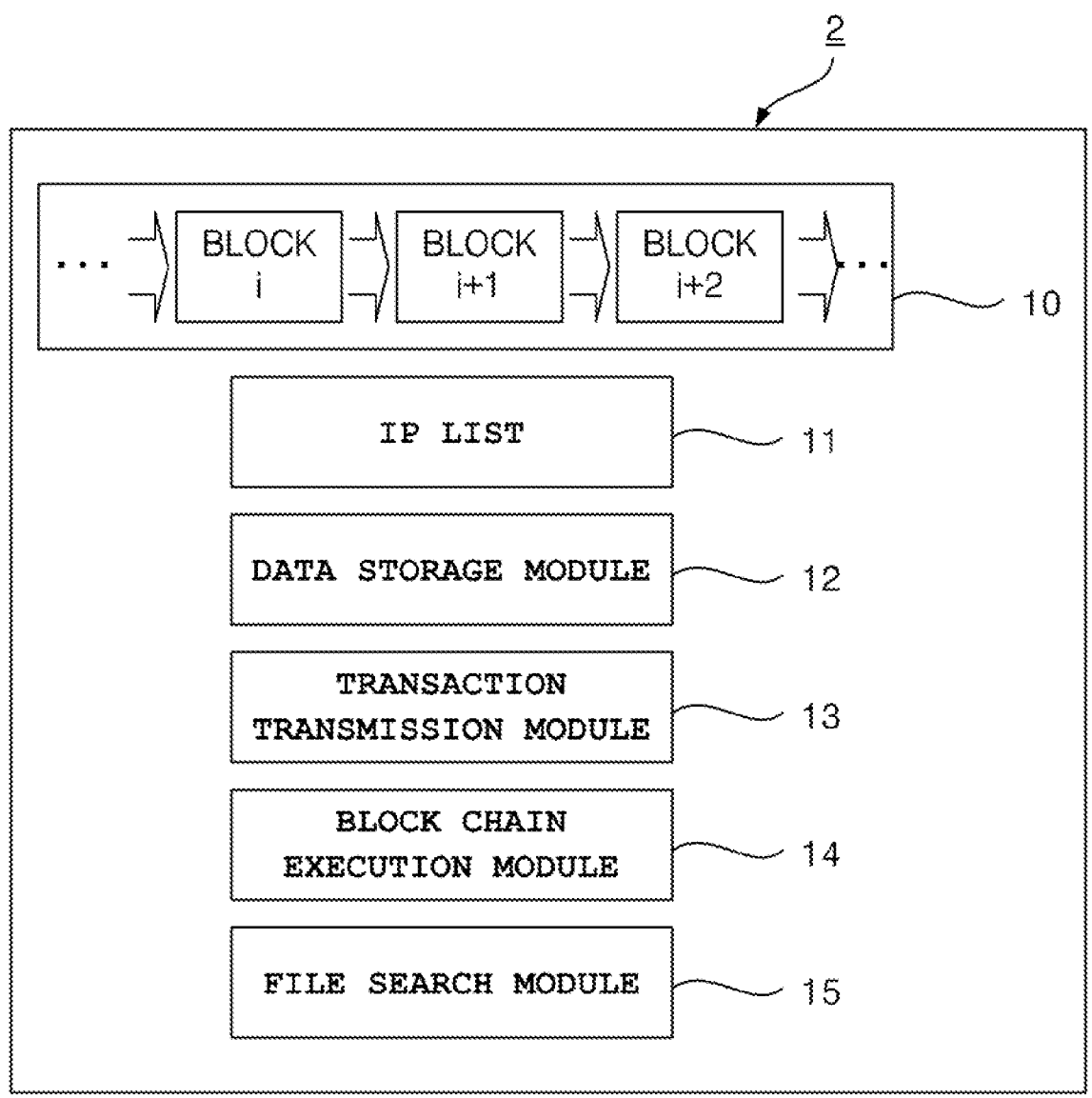
FIG. 2 is a block diagram illustrating a structure of each node in the file management/search system according to the preferred embodiment of the present invention.

FIG. 1 is a block diagram of a file management/search system based on a block chain according to a preferred embodiment of the present invention. FIG. 2 is a block diagram illustrating a structure of each node in the file management/search system according to the present invention.

Referring to FIGS. 1 and 2, the file management/search system 1 according to the preferred embodiment of the present invention is a system capable of managing and searching for data stored in a plurality of node by utilizing a block chain without a separate central management server. Each of the nodes 2, 3, 4, . . . , N includes a block chain 10, a data storage module 12, an IP list 11, a transaction transmission module 13, a block chain execution module 14, and a file search module 15.

The block chain 10 is configured by linking a plurality of blocks in a chain form. Each of the blocks is configured in the form of a Json file and includes a hash value of a current block, a nonce value, a hash value of a previous block and a time stamp. The hash value and the nonce value are values obtained by using a predetermined hash function for the data name and the IP address and the port number of the owner.

Figure 3:
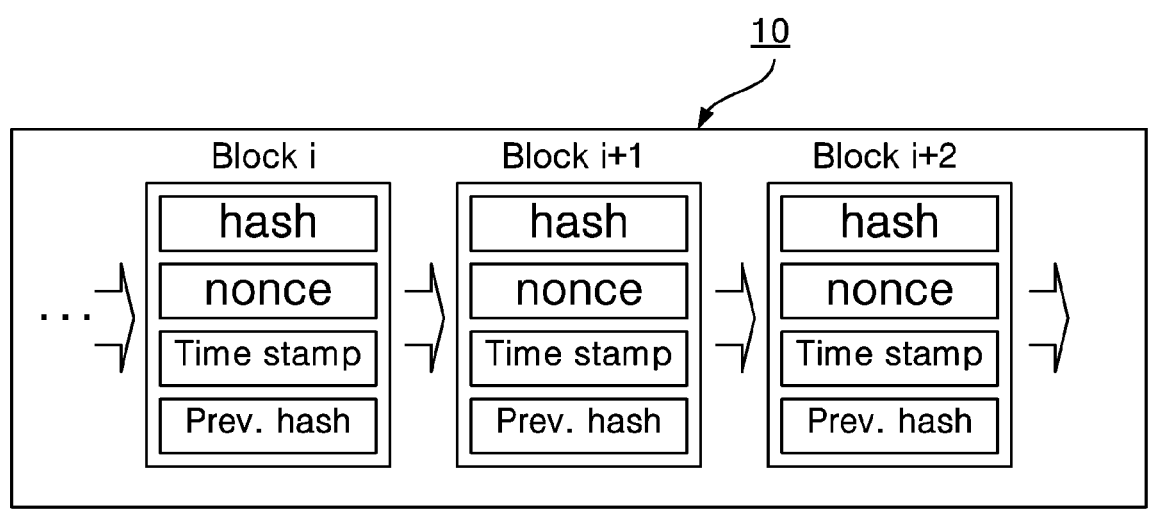
FIG. 3 is a conceptual diagram exemplarily illustrating a block chain provided in each node and blocks constituting the block chain in the file management/search system according to the preferred embodiment of the present invention.

FIG. 3 is a conceptual diagram exemplarily illustrating a block chain provided in each node and blocks constituting the block chain in the file management/search system according to the preferred embodiment of the present invention. Referring to FIG. 3, each of the blocks of the block chain includes not only a block hash value of the block chain but also a block hash value for the immediately previous block, so that the blocks of the block chain are linked to each other like a chain.

The IP list 11 stores the IP addresses and the port numbers of all the nodes having the block chain, and is provided by all the nodes.

The data storage module 12 is a memory area in which a generated data or file is stored in a preset folder. Each node designates, in advance, a folder for storing the data or the file to be shared with other nodes in a data storage area. With the system according to the present invention, it is possible to provide a file sharing platform in which all the nodes can share the data stored in the data storage module.

When the data or the file is stored or deleted in or from the preset folder of the data storage module 12, the transaction transmission module 13 sets a data name, generates a transaction containing information on the data or file including the data name, owner information, and a digital signature, and transmits the generated transaction to other nodes having the block chain. In this specification, for the convenience of description, the node that transmitted the transaction is referred to as a transaction transmitting node.

It is preferable that the data name is converted into an ASCII code form to be included in a transaction, and the IP address and the port number are converted into a decimal form to be included in the transaction.

It is preferable that when the data or the file is stored in the preset folder, the transaction transmission module adds a first flag indicating the generation of the data or the file to the transaction as a portion of the information on the data; and when the data or the file is stored from the preset folder, the transaction transmission module adds a second flag indicating the deletion of the data to the transaction a portion of the information on the data.

When receiving a transaction from other nodes having the block chain, the block chain execution module 14 generates a block for the received transaction and links the block to the block chain to expand the block chain. In the present specification, for the convenience of description, the node receiving the transaction from the transaction transmitting node is referred to as a transaction receiving node. Hereinafter, the operation of the block chain execution module 14 will be described in more detail.

When the block chain execution module receives a transaction from another node, the block chain execution module executes a proof of work to generate the necessary block hash value in order to to generate the block. The proof of work is a task of generating a hexadecimal block hash value satisfying a predetermined number of 0's by calculating a random nonce value with the received transaction by using a preset hash function. The system according to the present invention uses a SHA 256 hash function. In addition, other hash functions may be used. The reason for executing the proof of work is to allow which node among the nodes participating in the block chain is to generate the block not to be known, so that a malicious node cannot identify the node to generate the current block, and thus, a malicious attack can be prevented. For example, the height of the block chain of the bit coin is 417453, and the number of 0's of the block hash value is 17. In the bit coin, a degree of difficulty of block generation is adjusted by increasing the number of 0's. The degree of difficulty of block generation is set in such a manner that the number of 0's is taken to generate one block every 10 minutes as a reference based on a system having the highest performance CPU or GPU at present.

When a node has first succeeded in the proof of work among the transaction receiving nodes, the block chain execution module finds a block hash value and a random nonce value generates a block by using the block hash value and the nonce value, and transmits a message indicating that the block is generated, the found block hash value, and the random nonce value to all the nodes. In the present specification, for the convenience of description, the node that has first succeeded in the proof of work among the transaction receiving nodes is referred to as proof-of-work succeeding node.

When the block hash value and the nonce value are received from the proof-of-work succeeding node, the block chain execution module verifies the validity of the transaction, the received block hash value, and the received nonce value by using the validity verification algorithm. After that, when the verification of validity is completed, the block chain execution module generates an additional block by using the received block hash value and the received nonce value and links the additional block to the block chain.

The file search module 15 is configured to search for the data stored in each node and the owner by using the block chain 10 and the IP list 11.

When the data name to be searched for is input, the file search module reads out the nonce value of each block stored in the block chain, generates the block hash value by using the read nonce value, the input data name, and the IP address and the port number of each node in the IP list, and determines whether or not the generated block hash value matches with the block hash value of the block including the nonce value. If there is a block having the block hash value that matches with the generated block hash, it is determined that the node having the corresponding IP address and the port number is the owner, and the corresponding node is requested to transmit the corresponding data. If there is no block having the block hash value that matches with the generated block hash value, it is determined that there is no corresponding data.

Meanwhile, in the system according to the present invention, if one transaction is received from other nodes having the block chain, the block chain execution module generates one block for the received one transaction and links the block to the block chain.

Hereinafter, a file management/search method at each node in the file management/search system based on the block chain having the above-described configuration will be described in more detail.

Figure 4:
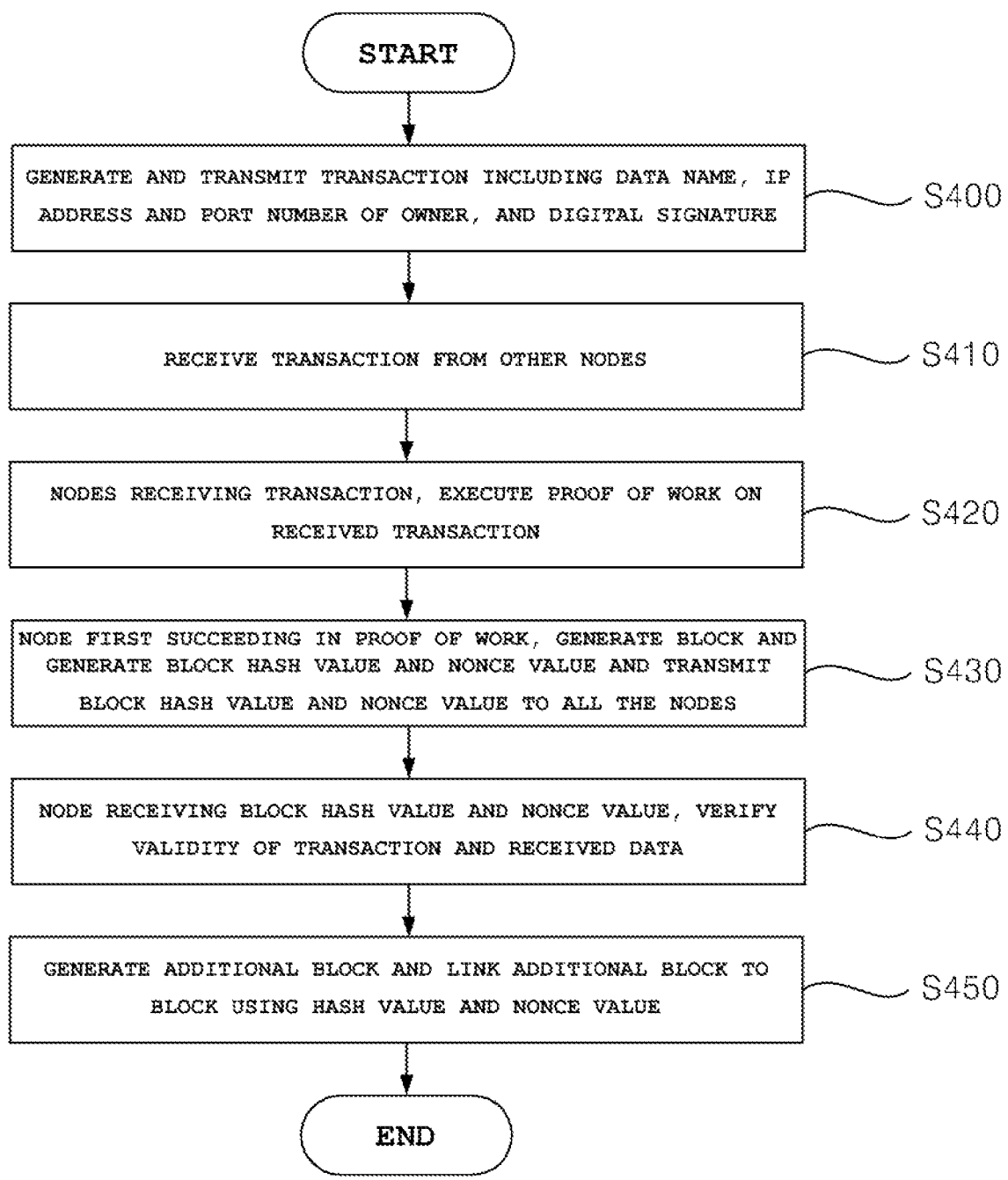
FIG. 4 is a flowchart illustrating processes of linking blocks including data names and owner information to a block chain performed by each node in the file management/search system according to the preferred embodiment of the present invention.

FIG. 4 is a flowchart illustrating processes of linking blocks including data names and owner information to a block chain performed by each node in the file management/search system according to the preferred embodiment of the present invention. Referring to FIG. 4, the processes of linking the blocks including data names and owner information to the block chain performed by each node will be described in detail.

Each node has a block chain and an IP list, and each node designates, in advance, a folder for storing the data or the file to be shared with other nodes in the data storage area.

First, each node generates the data or the file in the preset folder by the transaction transmitting module, sets a name for the data or the file when the data or the file is stored or removed in from the preset folder, generates a transaction including the data name, an IP address and port number of the node as an owner of the data, in which the data is stored, and a digital signature, and transmits the generated transaction to all of the other nodes (step 400). At this time, it is preferable that the transaction further includes one of a first flag indicating data generation and a second flag indicating data deletion, so that it can be determined whether the corresponding data is generated or deleted in later searching.

Meanwhile, other nodes receive the transaction from the transaction transmitting node (step 410).

The transaction receiving nodes execute a proof of work through the block chain execution module to generate the block hash value necessary for the received transaction in order to generate the block (step 420).

The node that has first succeeded in the proof of work among the transaction receiving nodes finds a block hash value and a random nonce value through a block chain execution module, generates a block by using the block hash value and the random nonce value, and transmits a message indicating block generation, the found block hash value, and the found random nonce value to all the nodes (step 430).

The other nodes receiving the block hash value and the nonce value from the proof-of-work succeeding node verify the validity of the transaction, the received block hash value, and the received nonce value by using the validity verification algorithm (step 440). After that, when the verification of validity is completed, each of the other nodes generates an additional block by using the received block hash value and the received nonce value and links the additional block to the block chain (step 450).

Figure 5:
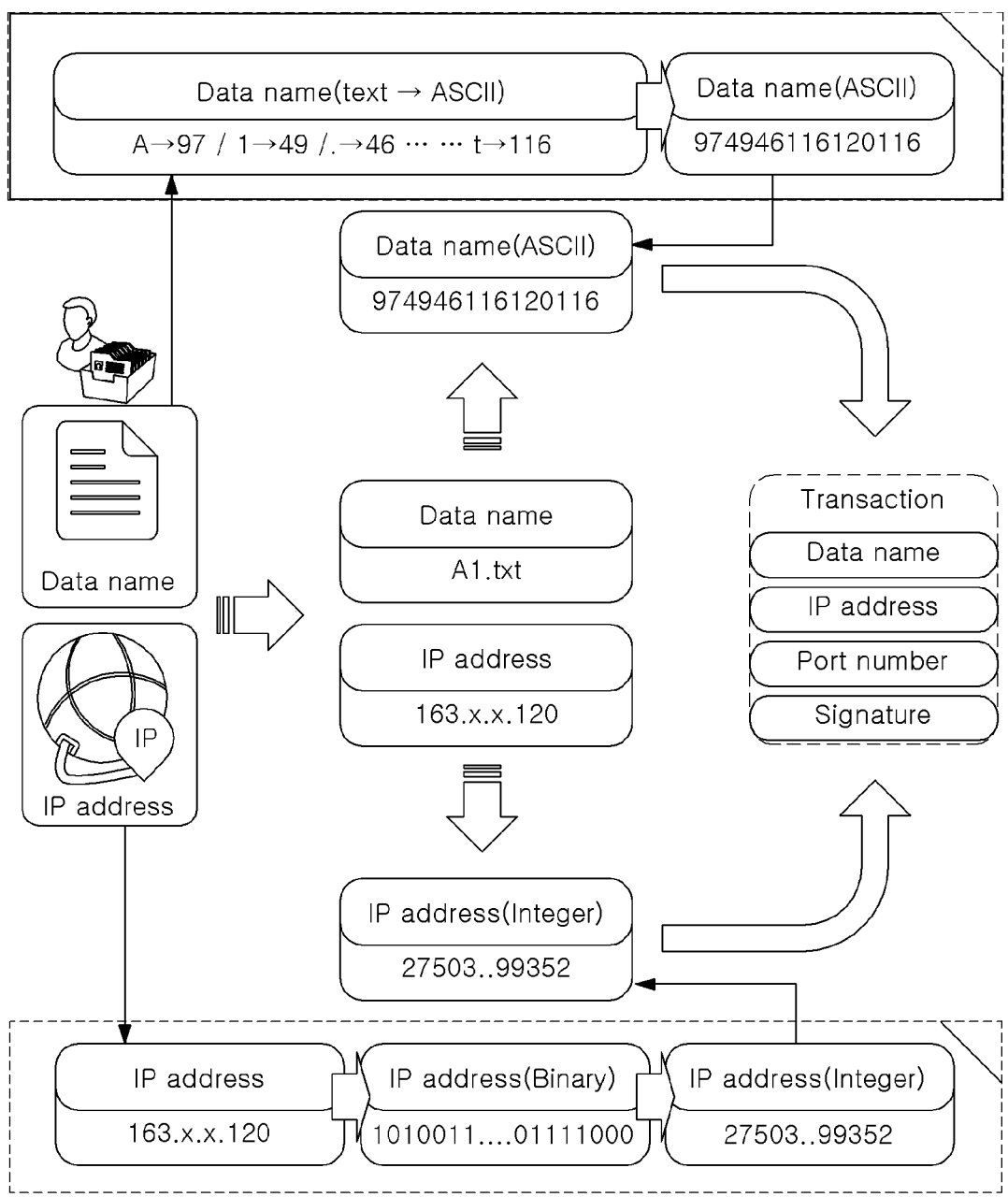
FIG. 5 is a block diagram illustrating a process of a transaction management module of each node generating a transaction in the file management/search system according to the preferred embodiment of the present invention.

FIG. 5 is a block diagram illustrating a process of a transaction management module of each node generating a transaction in the file management/search system according to the preferred embodiment of the present invention.

Referring to FIG. 5, the owner generates a data or a file in a pre-designated folder and names a1.txt as a data name. The node that first participates in the block chain generates an arbitrary folder in the same directory as the block chain execution program and stores the blocks of the block chain in the folder. On the other hand, it is preferable that each node uses Python's Watchdog API to monitor the generation, deletion, and modification of all files in a user-specified folder and executes the Python program only when the file is generated. At this time, it is preferable to inform the current state of the data or the file having the name by including a preset flag in the transaction. For example, when a data or a file is generated, a first flag is included in the transaction, and when a data or a file is deleted, a second flag is included in the transaction, so that the node requiring the data having the name can check the presence of the data during the searching. Meanwhile, it is preferable that the generated and deleted data names are expressed as data names through simple enumeration by using an ASCII code capable of expressing characters by numeric values, and the IP addresses are converted into binary numbers and, after that, converted into decimal numbers. The transaction is generated together with the data name, the IP address and port number of the owner, and digital signature extracted through this process.

FIG. 6 is a diagram illustrating the file management/search system according to the preferred embodiment of the present invention, (a) illustrates that a transaction transmitting node as a data owner that has generated a data or a file outputs a transaction transmission result, and (b) illustrates that a transaction receiving node outputs a transaction reception result.

Referring to FIG. 6A, nodes participating in the block chain have an IP list for all the nodes, and the IP list stores IP addresses and port numbers of nodes participating in the block chain. After generating the data, the node generating the transaction transmits the transaction to all the nodes by using the IP address and port number stored in the IP list. At this time, as the transmission method, TCP Socket communication is used. Referring to FIG. 6(*b*), it can be seen that the remaining nodes other than the node generating the transaction successfully receive the transaction as a result of reception of the transaction. In the related art, a block chain used in a bit coin requires much information such as a transmission address, a reception address, a transaction amount, and the like within a transaction. However, in a block chain according to the present invention, in order that all the nodes can identify a position of shared data, by transmitting only a data name and owner information in a transaction, so that it is possible to reduce a size of a packet to be transmitted and received and to minimize a bandwidth of a link.

Figure 7:
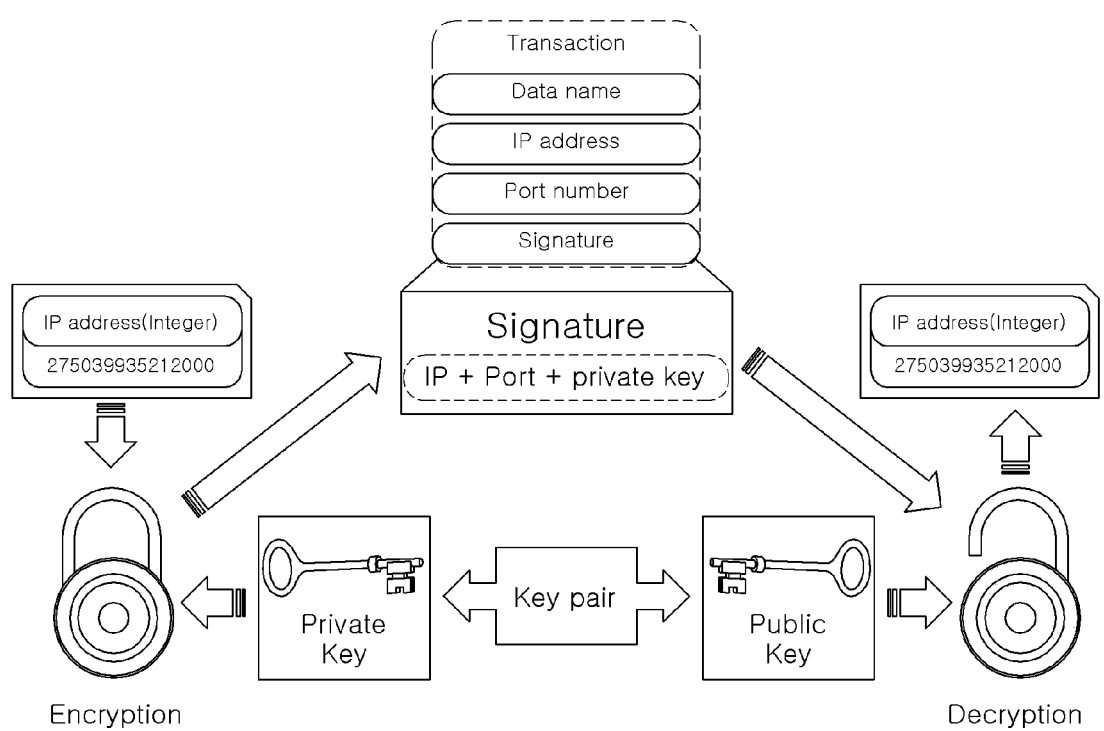
FIG. 7 is a conceptual diagram illustrating an encryption/decryption algorithm for a digital signature in the file management/search system according to the preferred embodiment of the present invention.

FIG. 7 is a conceptual diagram illustrating an encryption/decryption algorithm for a digital signature in the file management/search system according to the preferred embodiment of the present invention. FIG. 8 illustrates a transaction including a digital signature and a public key.

Referring to FIG. 7, in the system according to the present invention, the transaction transmitting node as a data owner generates a digital signature by using a private key when transmitting a transaction, transmits the transaction with the generated digital signature included. The transaction receiving node decrypts the digital signature in the received transaction by using the public key and checks whether or not the IP address and port number of the owner transmitting the transaction match with the IP address and port number included in the transaction.

The system according to the present invention generates a digital signature by using a private key and a public key. The encryption theory used in the digital signature is ECDSA, in which the IP address of the transaction transmitting node and the port number of the owner to be used for TCP socket communication are listed, and encryption with the private key is performed to generate the digital signature. The digital signature is appended to the transaction, encloses the public key generated by ECDSA, and is transmitted to the other node. The transaction receiving node decrypts the digital signature by using the enclosed public key and checks whether the result of the output is "true" or "false", and verifies validity of the transaction. The checking of the digital signature prevents spoofing and thus, an arbitrary malicious node is prevented from transmitting an erroneous transaction to be included in the block.

Referring to FIG. 8, the transaction including the digital signature and the public key transmitted by the transaction transmitting node includes five pieces of information: a data generating owner and data name, an IP address, a port number, a public key, and a digital signature.

Hereinafter, in the file management/search system according to the preferred embodiment of the present invention, a result of the verification of validity of a transaction decrypted by using a public key by the transaction receiving node will be described. In the system according to the present invention, the transaction receiving node decrypts the digital signature by using the public key of the transaction transmitting node, and if is determined that the result of the decryption for the verification of validity of the transaction is "true", the block generating step is performed after the verification of validity. If it is determined that the result of the decryption is "false", the transaction is discarded.

Figure 9:
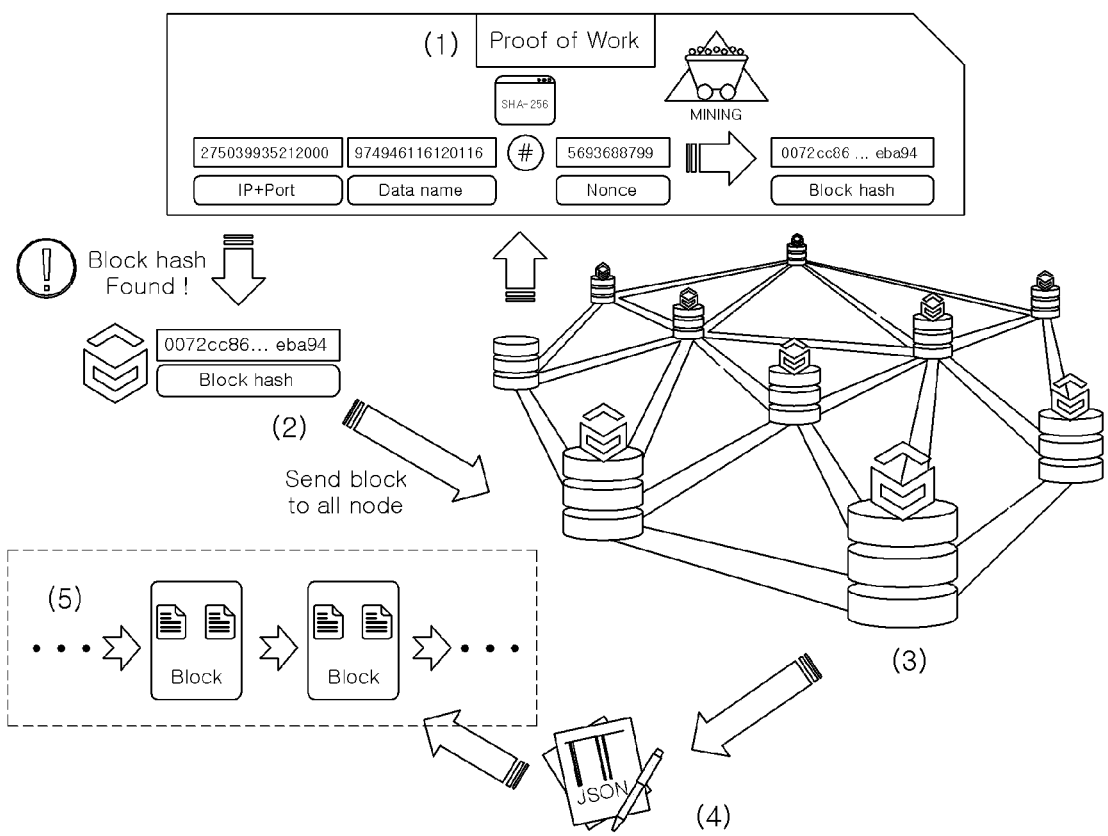
FIG. 9 is a conceptual diagram illustrating a process in which a transaction receiving node generates and transmits a block hash value through a proof of work in the file management/search system according to the preferred embodiment of the present invention.

FIG. 9 is a conceptual diagram illustrating a process in which the transaction receiving node generates and transmits a block hash value through a proof of work in the file management/search system according to the preferred embodiment of the present invention.

Referring to FIG. 9, the number of 0's of the block hash in the block chain of the actual bit coin is 17, the necessary degree of difficulty is set, and the degree of difficulty is set accordingly. Unlike the block chain in the related art, in the block chain of the present invention, the data name and the owner information are input to one block that is not a block including several transactions but a block includes only one transaction. That is, one data name and owner information are input to one block. A block hash is configured by using only this information, and at the time of later data searching the data name and owner information can be checked by analyzing the block hash.

In order to apply the hash algorithm, the IP, port, and data names received in the transaction are listed, the nonce value is randomly generated, and the block hash is generated by using the SHA256 hash algorithm (1). Until a hash value having the number of 0's as a set reference value larger than 17, the nonce continues to be changed. When the hash satisfying the condition is found, the hash is accepted as a block hash. The block hash value and nonce value generated by an arbitrary node are transmitted to all the nodes participating in the block chain (2). The receiving node analyzes the received block hash value and nonce value and performs verification of validity (3). By performing the verification of validity of the block, it can be checked that the result of the hash algorithm matches with the received block hash. Since each node has all transaction information for generating a block, it lists the IP addresses, port numbers, and data names in the transaction information, and performs an SHA256 hash algorithm by using the received nonce value. When the output hash value matches with the received block hash value, the node recognizes that the content of the transaction has not changed, and thus, it is possible to prevent the malicious node from generating a block. Blocks of which block validity has been verified are linked to the block chain (5), after the contents thereof are stored in the form of a Json file (4).

FIG. 10 is a diagram illustrating that blocks newly generated by respective nodes are stored in the form of a Json file in the file management/search system according to the preferred embodiment of the present invention.

Referring to FIG. 10, the block is stored in the form of the Json file and includes a time stamp ('time'), a hash value ('hash') of the current block, a nonce value, and a hash value ('prey hash') of the previous block.

Figure 11:
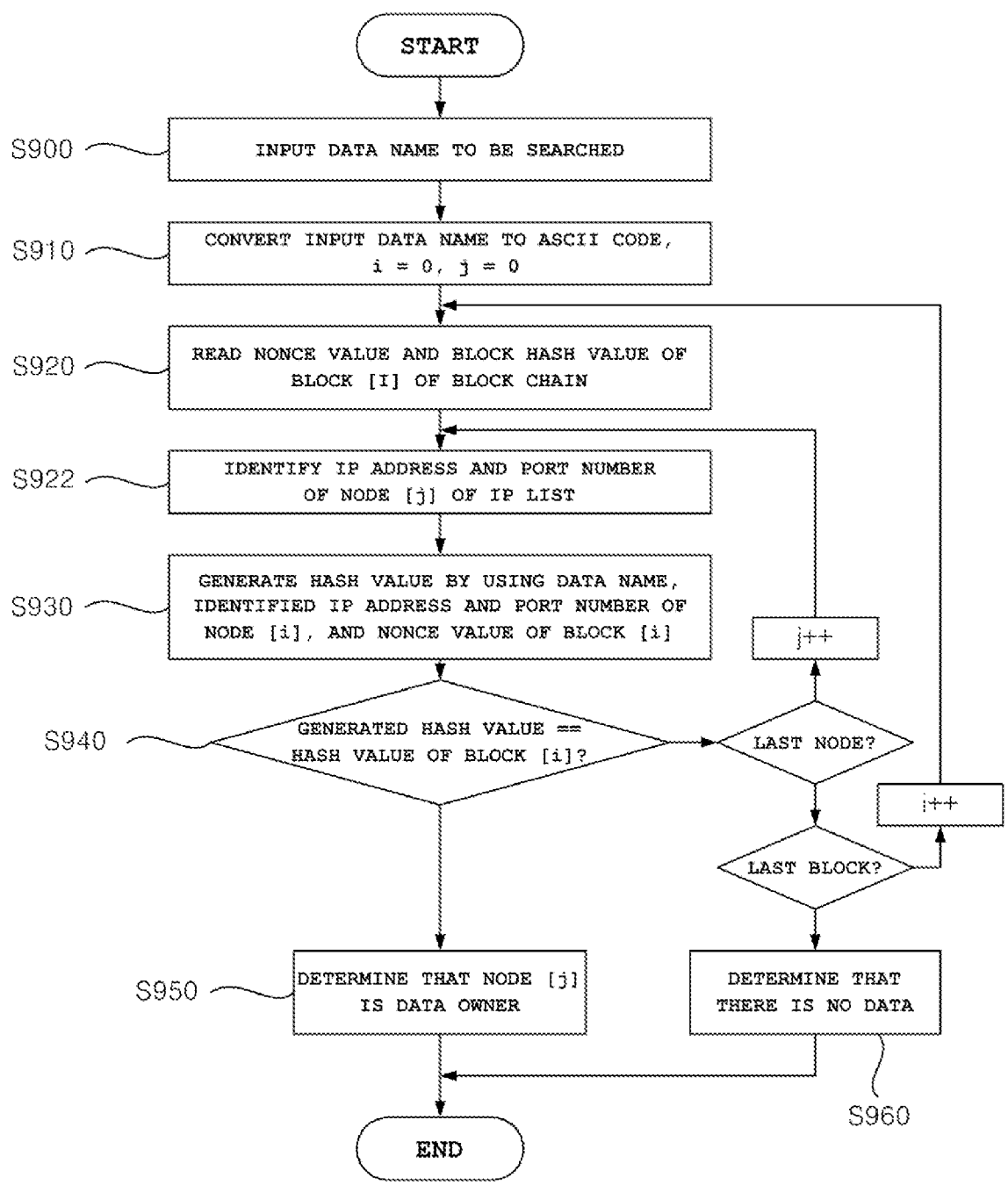
FIG. 11 is a flowchart illustrating an operation of a file search module of each node in the file management/search system according to the preferred embodiment of the present invention.
Figure 12:
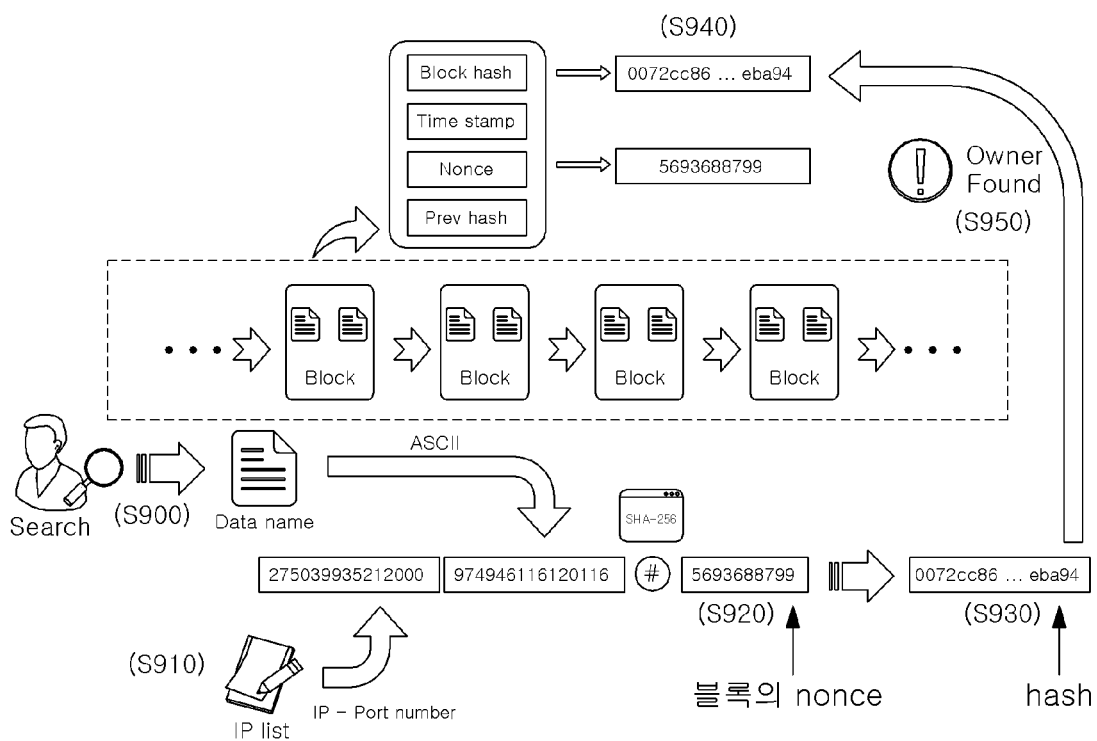
FIG. 12 is a conceptual diagram illustrating a process of identifying an owner after searching fora data name stored in a block chain of each node.

FIG. 11 is a flowchart illustrating operations of a file search module of each node in the file management/search system according to the preferred embodiment of the present invention. FIG. 12 is a conceptual diagram illustrating of a process of searching for the data name stored in the block chain by using the file search module of each node and identifying the owner.

FIG. 12 illustrates the process of searching for the data name for a user participating in the block chain to receive necessary data and identifying an owner having the corresponding data. Referring to FIGS. 11 and 12, if the user first inputs a data name (A) as a text (step 900), the data name is converted into an ASCII code, and after that, the data name together with the information of the IP addresses and port numbers of the nodes in the IP list 11 is listed (step 910). The block chain 10 stored in the Json file format is read, and the nonce value of the corresponding block is read (step 920). The hash value is obtained by applying the SHA256 hash algorithm together with the read nonce value and the previously listed information (step 930). It is determined whether or not the obtained hash value matches with the block hash value in the Json file (step 940). One of the Json blocks is opened, and the hash value together with the nonce value is searched for by using the IP address and port number of all the nodes in the IP list. When there is no matching hash value, the next block is opened, and the same process is repeated. When the hash value matching with the hash value of the block is found, it can be identified that the node having the corresponding IP address and port number is the owner of the searched data (step 950). When the searched data name does not exist in the block chain, "not found" is returned (step 960).

FIG. 13 is a diagram illustrating the file management/search system according to the preferred embodiment of the present invention, (a) illustrates that a block Json file of a block chain is opened and comparison with information of an IP list, and (b) illustrates a result of finding the searched data name in the block chain.

Referring to (a) of FIG. 13, the Jason file for each block constituting the block chain is opened, the nonce value is read, the IP address and the port number for each node constituting the IP list are read, and the hash value is obtained by using the input data name, the read IP address and port number of each node, and the nonce value of each block. When the hash value obtained in this manner matches with the hash value of the block including the nonce value, the corresponding node is identified as the owner of the data.

As described above, the file management/search system according to the present invention can implement a platform capable of identifying a list of sharable files by searches for a hash of a block chain of a data name by finding an IP address and port information of a file owner. In addition, the file management/search system according to the present invention can implement a file sharing system in which, when the owner information of the data is identified on the block chain, the node that performs the searching requests the owner node to transmit the corresponding data, and the file is transmitted through TCP socket communication after the owner node is identified.

Meanwhile, in the file management/search system according to the present invention, since only the data name and the owner information through the block chain are stored and the necessary data is shared and requested through the block chain searching, it is possible to solve the problem of the cloud system in the related art in that the entire files for sharing are stored and, thus, a large storage capacity is required. In addition, since heights of blocks, the number of blocks, transaction information, and the like are excluded and only the information such as block hash and nonce necessary for the data searching is stored as the information of the block included in the block chain, it is possible to solve the problem of the large storage capacity of the block chain itself.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

INDUSTRIAL APPLICABILITY

The systems and methods according to the present invention can be widely used in file sharing systems.

The invention claimed is:

1. A file management/search system for managing/searching for a data or a file stored in a plurality of nodes by utilizing a block chain,
   wherein each of the nodes includes:
   a block chain configured so that blocks including at least a block hash value and a nonce value are linked;
   an IP list that stores IP addresses and port numbers for all the nodes having the block chain;
   a transaction transmission module that generates a transaction including information on a data and owner information when the data or the file is stored or deleted in or from a preset folder and transmits the generated transaction to other nodes having the block chain; and
   a block chain execution module that, when the transaction is received from another node having the block chain and the block for the received transaction is first generated, transmits a block hash value and a nonce value to other nodes, and when a block hash value and a nonce value are received from another node, generates a block by using received information and links the block to the block chain, and
   wherein each block of the block chain is generated for each data or file stored in a plurality of the nodes, and the block hash value of each block is a hash value generated by applying a preset hash algorithm to information on the data, information on an owner of the data, and the nonce value.

2. The file management/search system according to claim 1,
   wherein the information on the data in the transaction includes a data name, and
   wherein the information on the owner of the data in the transaction includes the IP address and the port number of the node in which the data is stored.

3. The file management/search system according to claim 1, wherein the transaction transmitting module
   sets a data name when the data or the file is stored or deleted in or from the preset folder,
   generates a transaction including the set data name and the IP address and the port number of the corresponding node, and
   transmits the generated transaction to other nodes having the block chain.

4. The file management/search system according to claim 3,
   wherein the data name is converted into an ASCII code and included in the transaction, and
   wherein the IP address and the port number are converted into a decimal format and included in the transaction.

5. The file management/search system according to claim 3, wherein the transaction transmission module allows a first flag indicating data generation to be included in the information on the data and added to the transaction when the data or the file is stored in the preset folder, and allows a second flag indicating data deletion to be included in the information on the data and added to the transaction when the data or the file is deleted from the preset folder.

6. The file management/search system according to claim 1, wherein the block chain execution module executes proof of work on the information of the received transaction to generate the block hash value and the nonce value, and transmits the generated block hash value and the generated nonce value to other nodes when the transaction is received from another node, and verifies validity of the received transaction by using the received block hash value and the received nonce value when the block hash value and the nonce value are received from another node, and generates the block when the validity is verified, and links the generated block to the block chain.

7. The file management/search system according to claim 1, further comprising a file search module that searches for the data stored in each node and the owner by using the block chain, wherein the file search module, when a data name to be searched for is input, reads the nonce value of each block stored in the block chain, generates a hash value by using the read nonce value, the input data name, and the IP address and the port number of each node in the IP list, and determines whether or not the generated hash value matches with the block hash value of the block including the nonce value, when there is a block having the block hash value that matches with the generated hash value, determines that the node having the corresponding IP address and the corresponding port number is the owner, and when there is no block having the block hash value that matches with the generated hash value, determines that there is no corresponding data.

8. The file management/search system according to claim 1, wherein, the block chain execution module, when one transaction is received from another node having the block chain, generates one block for one received transaction and links the generated block to the block chain.

9. A file management/search method in each node for managing/searching for a data stored in a plurality of nodes by utilizing a block chain, comprising steps of:

(a) storing a block chain of blocks, the block chain including at least a hash value and a nonce value of the block;

(b) configuring an IP list storing IP addresses and port numbers for all the nodes having the block chain;

(c) generating a transaction including information on the data and owner information when the data or the file is stored or deleted in or from a preset folder and transmitting the generated transaction to other nodes having the block chain; and (d) when the transaction is received from other nodes having the block chain, generating a block for the received transaction and linking the block to the block chain;

wherein each block of the block chain is generated for each data or file stored in a plurality of the nodes, and the block hash value of each block is a hash value generated by applying a preset hash algorithm to information on the data, information on an owner of the data, and the nonce value.

10. The file management/search method according to claim 9, wherein the information on the data in the transaction includes a data name, and wherein the information on the owner of the data in the transaction includes the IP address and the port number of the node in which the data is stored.

11. The file management/search method according to claim 9, wherein, the step (c) includes:

setting a data name when the data or the file is stored or deleted in or from the preset folder;

generating a transaction including the set data name, the IP address and the port number of the corresponding node and a digital signature information; and transmitting the generated transaction to other nodes having the block chain.

12. The file management/search method according to claim 11, wherein the data name is converted into an ASCII code and included in the transaction, and wherein the IP address and the port number are converted into a decimal format and included in the transaction.

13. The file management/search method according to claim 9, wherein the step (c) includes:

allowing a first flag indicating data generation to be included in the information on the data and added to the transaction when the data or the file is stored in the preset folder; and allowing a second flag indicating data deletion to be included in the information on the data and added to the transaction when the data or the file is deleted from the preset folder.

14. The file management/search method according to claim 9, wherein the step (d) includes:

when the transaction is received from another node, executing proof of work on the information of the received transaction to generate the block hash value and the nonce value, and when the block hash value and the nonce value are first generated among all the nodes, generating the block by using the block hash value and the nonce value, and transmitting the generated block hash value and the generated nonce value to other nodes; and when the block hash value and the nonce value are received from another node, verifying validity of the received transaction by using the received block hash value and the received nonce value and generating the block when the validity is verified; and linking the generated block to the block chain.

15. The file management/search method according to claim 9, further comprising (e) a file searching step of searching for and providing a data name requested externally, wherein the file searching step (e) includes:

when a data name to be searched for is input, reading the nonce value of each block stored in the block chain, generating a hash value by using the read nonce value, the input data name, and the IP address and the port number of each node in the IP list, and determining whether or not the generated hash value matches with the block hash value of the block including the nonce value;

when there is a block having the block hash value that matches with the generated hash value, determining that the node having the corresponding IP address and the corresponding port number is the owner; and when there is no block having the block hash value that matches with the generated hash value, determining that there is no corresponding data.

\* \* \* \* \*